US006250526B1

(12) United States Patent
Bess

(10) Patent No.: US 6,250,526 B1
(45) Date of Patent: Jun. 26, 2001

(54) KIT FOR SUSPENDING TOYS AND THE LIKE ABOUT THE REAR SEAT OF A VEHICLE

(76) Inventor: Luke Bess, 4 Hurtgen Pl., Fort Bragg, NC (US) 28307

( * ) Notice: Subject to any disclaimer, the term of this patent is extended or adjusted under 35 U.S.C. 154(b) by 0 days.

(21) Appl. No.: 09/467,398

(22) Filed: Dec. 20, 1999

(51) Int. Cl.$^7$ .................................................. B60R 7/04
(52) U.S. Cl. .................... 224/275; 224/325; 224/563; 446/227; 446/228
(58) Field of Search .............................. 224/275, 311, 224/325, 563; 446/227, 228

(56) References Cited

U.S. PATENT DOCUMENTS

| D. 359,937 | * | 7/1995 | Yoshie et al. | D12/129 |
|---|---|---|---|---|
| 1,978,216 | * | 10/1934 | Miller | 224/275 |
| 2,327,253 | * | 8/1943 | Eisel | 446/227 |
| 3,085,610 | * | 4/1963 | Vardan | 446/227 |
| 3,552,613 | * | 1/1971 | Nye | 224/42.46 |
| 4,722,713 | * | 2/1988 | Williams et al. | 446/227 |
| 5,288,003 | * | 2/1994 | MacDonald | 224/328 |
| 5,702,039 | * | 12/1997 | Olaiz | 224/250 |
| 5,868,294 | * | 2/1999 | Webster | 224/275 |

* cited by examiner

Primary Examiner—Stephen P. Garbe
(74) Attorney, Agent, or Firm—Coats & Bennett, P.L.L.C.

(57) ABSTRACT

A kit for installation across a rear seat of a vehicle that suspends objects such as toys, rattles, etc. in easy reach of a child seated on the seat of the vehicle. More particularly, the kit includes a suspension line and a series of hanger lines along with a pouch for holding objects. The suspension line is flexible in nature and includes opposed end portions that are adapted to be secured to supports disposed on opposite sides of the vehicle above the rear seat. In addition, the respective hanger lines includes hook and loop fasteners formed on one end that permit the hanger lines to be looped and secured around the suspension line and wherein the hanger lines can even slide laterally back and forth on the suspension line. When suspended, each hanger line includes a lower terminal end portion that also includes hook and loop fasteners that permit the respective hanger lines to be secured to objects such as toys, rattles, etc. The pouch, referred to above, includes a pair of extension or tie lines that extends therefrom and which are adapted to be secured to the suspension line such that the pouch can also be suspended in easy reach of the child. Thus once suspended in the vehicle, the device of the present invention functions to suspend and hold toys and other objects in easy reach of the child while the child is safely seated in a child restraint seat that itself is stationed on a rear seat in the vehicle.

15 Claims, 2 Drawing Sheets

KIT FOR SUSPENDING TOYS AND THE LIKE ABOUT THE REAR SEAT OF A VEHICLE

FIELD OF THE INVENTION

The present invention relates to automobile accessories and more particularly to a system and device for holding children's toys and amusement devices. More particularly, the present invention relates to a suspension system that extends over a rear seat area of a vehicle that functions to receive and hold objects such as toys and rattles in easy reach of a child that is seated in the rear seat area.

BACKGROUND OF THE INVENTION

Parents fully appreciate the problems and frustrations of traveling with children, especially toddlers the fall within the age range of one to four years old. Often, parents will place toys, amusement devices and other preoccupying objects in the hands of the child or in easy reach of the child. However, experience tells us that it is just a matter of time before these toys and other amusement devices have fallen into the floorboard area of the vehicle or outside the reach of the child. Obviously what follows is an unhappy child.

The basic problem of attempting to preoccupy a child on long trips has been addressed, but only to a very limited extent. For example, U.S. Pat. No. 4,540,219 discloses an infant's automobile safety seat that is provided with a cover of sheet material for wrapping around the shield of the seat. The cover is provided with means for releaseably attaching items to the cover. While this design does attempt to secure stuffed animals and other characters to the shield, it has significant restrictions. First, only a small number of items can be secured. Further, once secured, the items are relatively fixed and cannot be moved back and forth without actually disconnecting the stuffed animals from the shield.

Therefore, there has been and continues to be a need for a device that is adapted to be suspended within a vehicle and which acts to hold and secure toys and other amusement devices in easy reach of a child that may be secured within a vehicle child safety seat.

SUMMARY OF THE INVENTION

The present invention relates to a device or kit that is designed to be suspended internally within a vehicle for holding, securing and suspending objects such as toys, rattles, etc. such that these objects are held in easy reach of a child seated in the vehicle.

In one form, the present invention is presented in a kit. The kit includes an elongated flexible suspension line that is designed to be extended over a back seat area of the vehicle and secured about opposite ends to supports that are disposed on opposite sides of the vehicle above a rear seat area of the vehicle. Secured to the suspension line are one or more hanger lines that depend downwardly from the suspension line. The respective hanger lines include opposed end portions. Formed on one end portion of each hanger line, is a hook and loop fastener that enables the end portion to be looped and secured around the suspension line. The formed loop, in one particular embodiment, is somewhat open so as to enable the entire hanger line to be laterally shifted or moved along the suspension line. About the opposed end of the hanger line, there is provided another hook and loop fastener set for securing the lower terminal end portions of the hanger lines to objects such as toys, stuffed animals, rattles, etc. When suspended, the respective hanger lines depend downwardly, generally in front of the seated child but in easy reach of the child. The child can, from a seated position within a child safety seat, for example, reach the respective hanger lines and pull the lower terminal ends towards the child such that the child can handle and play with the object or toy that is secured to that hanger line.

In one embodiment of the present invention, the kit includes a pouch or an object holder, which functions to hold toys, rattles, stuffed animals and the like. This pouch is of an open top construction and includes a pair of tie lines or extension lines that extend therefrom. These extension lines are designed to extend upwardly and loop and secure around the main suspension line such that the entire pouch can be suspended in front or adjacent to the child while the child is seated in the vehicle.

Finally, the present invention entails a method of securing and suspending objects such as toys, rattles and other children preoccupation devices within a vehicle. Essentially, the method is carried out by securing a suspension line across a rear seat area of a vehicle such that opposite ends of the suspension lines are double backed or looped around conventional supports that are anchored on opposite sides of the vehicle above the seat area. These supports found in vehicles are sometimes referred to as garment hangar supports. Next, one or more hanger lines are suspended from the suspension lines and about the lower terminal end of these hanger lines a series of toys or other amusement devices are secured thereto such that they are firmly held and secured in easy reach of the child.

Other objects and advantages of the present invention will become apparent and obvious from a study of the following description and the accompanying drawings which are merely illustrative of such invention.

DETAILED DESCRIPTION OF THE INVENTION

Figure 1:
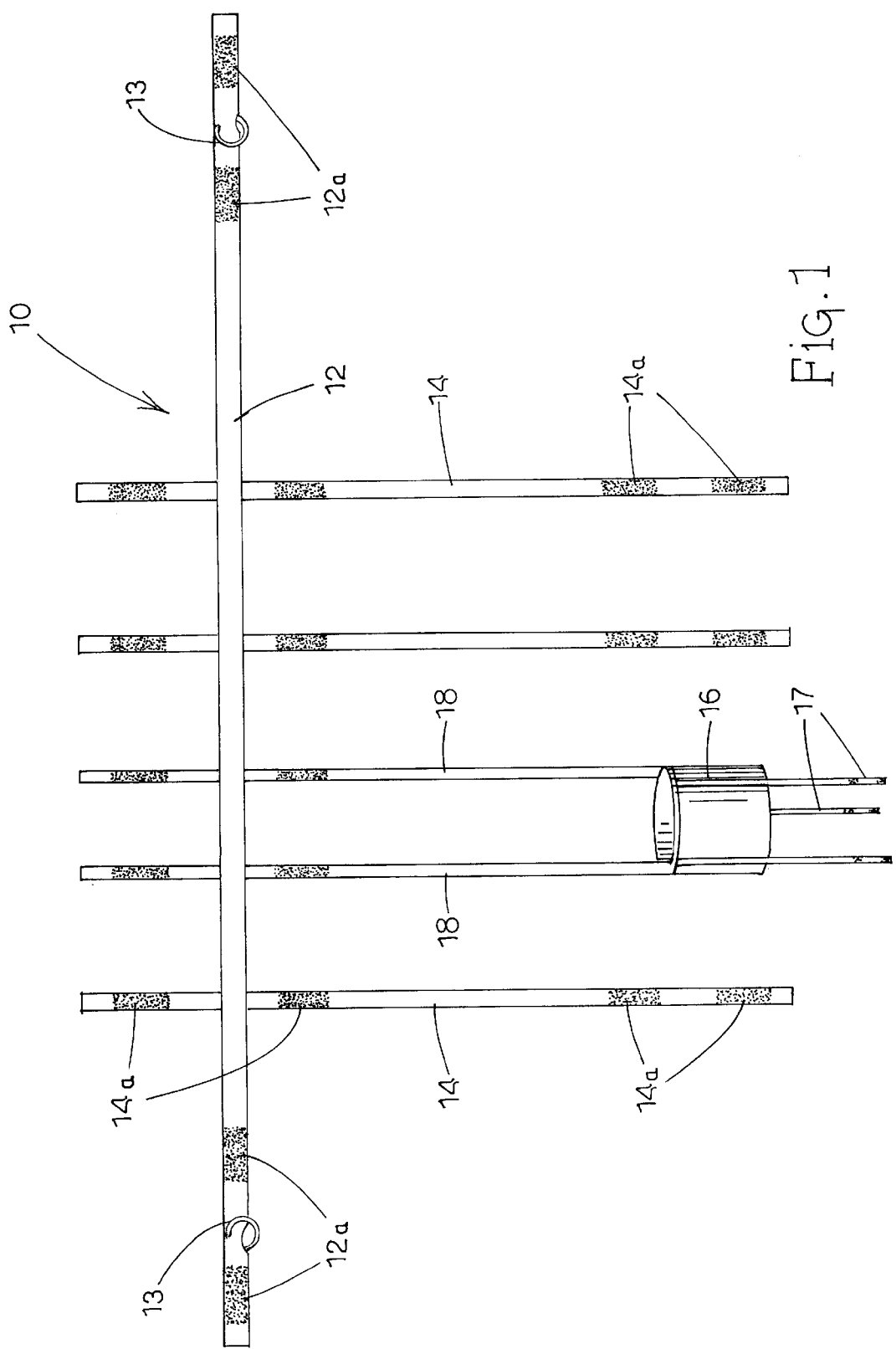
FIG. 1 is a top plan view of the kit of the present invention.

With further reference to the drawings, the toy suspension device is shown therein and indicated generally by the numeral 10. As noted above, the toy suspension device 10 as show herein, particularly in FIG. 1, is in the form of a kit. As a kit, the toy suspension device includes a number of components that are adapted to be secured together and suspended within a vehicle for the purpose of holding and suspending objects such as toys, rattles, stuffed animals and other devices that are normally used to preoccupy children.

Figure 2:
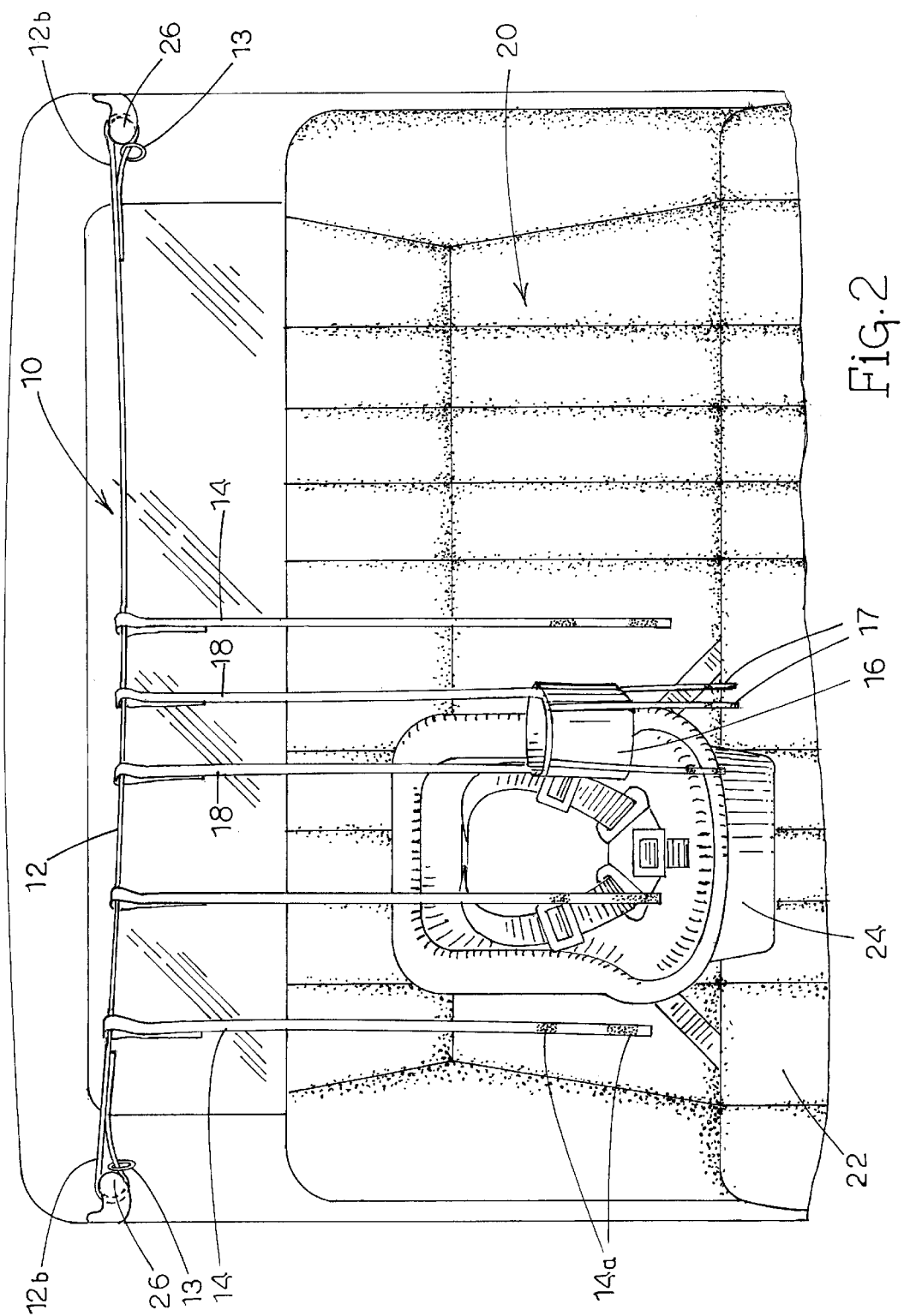
FIG. 2 is a front elevational view of a section of a vehicle showing the toy suspension kit suspended across the back seat area of a vehicle.

Viewing the kit 10 in more detail, it is seen that the same includes a main suspension line 12. In the embodiment illustrated herein, suspension line 12 is a flexible line that is adapted to extend over a rear seat area in a vehicle. As illustrated in FIG. 2, the suspension line 12 includes opposed end portions. Each opposed end portion includes a fastener 12a in the form a hook and loop fastener. That is, there is provided spaced apart hook and loop pads about opposed end portions of the suspension line 12. As will be appreciated from subsequent portions of this disclosure, the particular spacing of the hook and loop fasteners 12a enable the opposed end portions of the suspension line 12 to be formed into loops 12b and these loops enable the suspension line 12 to be secured between two spaced apart supports anchored within the vehicle.

The suspension line 12 further includes a pair of opposed rings 13 sewn or otherwise secured to opposite ends of the suspension line 12. As seen in FIG. 2, when the suspension line is connected across a rear seat area of a vehicle, the rings 13 are disposed about opposite sides of the vehicle. The purpose of the rings 13 is to attach to hanger hooks that may be provided in some vehicles in lieu of other types of support. In any event, the nature of the suspension line 12 and the opposed fasteners 12a enable the loops 12b to be selectively formed such that the rings are disposed at an appropriate spacing for connection to the hanger hooks.

Further, the kit 10 includes one or more hanger lines 14. Hangar lines 14 are designed to be secured around the suspension line 12 and to depend downwardly therefrom in spaced apart relationship. Each hanger line 14, in the preferred embodiment, is of a flexible design and includes opposed end portions. As with the suspension line 12, each opposed end portion of the hanger line 14 is provided with a fastener 14a that is presented in the form of a pair of spaced apart hook and loop pads. This enables each opposed end of each hanger line to be formed into a loop in order that it can be wrapped around and secured onto the suspension line 12. The other opposed end of each hanger line 14 also includes spaced apart hook and loop fastener pads. This enables the lower terminal end, as viewed in FIG. 2, to be secured to a stuffed animal, toy or other object that is used for the preoccupation of the child.

Next, the kit 10 of the present invention includes a pouch 16 for holing one or more objects such as toys, rattles, etc. The pouch is preferably pliable and soft in nature and includes an open top. Toys and other objects can be stuffed into the pouch and can extend upwardly through the open top thereof. Thus in use, the child can pull the various objects and toys from the pouch and play with them for a time period and then place them back into the pouch 16. To secure the pouch 16 to the suspension line 12, there is provided a pair of tie or extension lines 18 that extend from the pouch 16. These extension lines 18 are generally the same type of lines that form the hanger lines 14. About opposite ends of the extension lines 18 of the pouch, there would be a fastener such as a hook and loop fastener that will enable the opposed end portions of the extension lines to be looped and secured around the suspension line 12.

Pouch 16 also includes one or more toy tether lines 17. As seen in the drawings, the tether lines 17 are suspended from the pouch 16 and include terminal ends that are provided with hook and loop fasteners for attachment to toys, amusement devices, stuffed animals, and the like. Thus, it is appreciated that toys or other objects secured to the tether lines 17 can be stored or secured within the pouch even while attached to the end of the tether lines 17. However, when the child is playing with such toys or stuffed animals, it is appreciated that the tether line 17 will assure that the toys or objects suspended thereon will always be in reach of the child.

Turning to FIG. 2, the toy suspension device or kit 10 is shown mounted or suspended within a vehicle. Note that the vehicle includes a rear seat area indicated generally by the numeral 20. Rear seat area means an area of the vehicle that is disposed rearwardly of the driver's seat. Thus, the rear seat area does not necessarily have to be immediately behind the driver's seat. Expressed in another way, the toy suspension device 10 of the present invention could be suspended over any seat area located rearwardly of the driver's seat.

Disposed within the rear seat area 20 of the vehicle is a rear seat 22. In conventional fashion, there is shown a child's safety seat 24 disposed on the rear seat 22. Disposed on opposite sides of the vehicle above the rear seat 22 is a pair of supports 26. Supports 26 are of the type typically found disposed over the rear seat area of a vehicle. Sometimes these supports are referred to as garment supports. However, it should be appreciated that other types of supports located or anchored in the vehicle can be used to support and suspend the suspension line 12.

As seen in FIG. 2, the suspension line 12 is suspended above the rear seat 22 and is connected between the two opposed supports 26 anchored to the vehicle. Note that the opposed end portions of the suspension line 12 are looped such that they encircle the supports 26 and generally cause the entire suspension line 12 to be suspended between the supports 26.

In the illustration shown in FIG. 2, there are shown three hanger lines 14. It is appreciated that the number of hanger lines can vary. About the upper portion of each hanger line 14, the opposed end is looped and secured around the suspension line 12. Again, the hook and loop fasteners enable this opposed end to be looped and secured around the suspension line 12. As suspended in FIG. 2, note that the lower end portion of the hanger line is also provided with the hook and loop fastener 14a. This enables the lower end portion of the hanger lines 14 to be secured directly to objects such as toys, stuffed animals, rattles, etc. Also, because the loop can be formed loosely around the suspension line 12, it follows that the hanger 14 lines can be moved back and forth, from side to side, along the suspension line 12. The hanger lines 14 themselves are flexible and therefore the toys suspended on the ends thereof can be freely moved by the child and the fact that the hanger lines 14 can move laterally back and forth on the suspension line 12, gives even more free range of movement for the suspended objects.

It is also seen in FIG. 2 where the pouch 16 is suspended from the suspension line 12. The pouch, being of an open top construction, enables an array of toys and objects to be conveniently stored therein and located near the child and the child's safety seat 24. This, as mentioned above, enables the child to retrieve toys and objects from the pouch and to replace them from time to time during the course of a trip.

From the foregoing discussions, it is seen that the kit of the present invention is specifically designed to be suspended within a vehicle and to provide the child with easy and convenient access to toys, amusement devices, and other objects that a child may desire to play with during the course of a trip. Importantly, the toy suspension device 10 of the present invention is designed to securely hold the toys and objects within a close range of the child in such a fashion that the toys or objects do not continually fall to the wayside and out of the reach of the child. In short, the toy suspension device 10 of the present invention is designed such that the toys, and other objects that are suspended on the hangar lines 14 will always be in a close range of the child such that the child can pick and choose which toy or object he or she wants to play with and can engage the toy and object and the parents or those in charge of the child can rest assured that the toy or object will remain secured to the hangar lines 14 in close reach of the child.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of suspending and securing toys and other children preoccupation devices in a vehicle, comprising:
   a. extending a flexible suspension line over a rear seat of the vehicle;
   b. securing opposite ends of the suspension line to opposed supports mounted on each side of the vehicle above the rear seat;
   c. securing one or more hanger lines to the suspension line such that the hanger line depends downwardly from the suspension line;
   d. attaching an object to a terminal end portion of a respective hanger line such that the object is suspended adjacent the seat area where it can be easily reached and handled by a child seated on the rear seat of the vehicle; and
   e. wherein each of the one or more hanger lines include opposed end portions with each opposed end portion including a hook and loop fastener that enable one end portion to be configured into a loop that wraps around the suspension line while the other end portion of the hanger line is available to be secured to an object.

2. The method of claim 1 wherein each opposed end of the suspension line includes spaced apart mating hook and loop fasteners that permit the end portion of the suspension line to be formed into a loop and secured around the support located in the vehicle.

3. The method of claim 2 wherein the opposed ends of the suspension line include securing rings for attachment to hangar hooks anchored on opposite sides of the vehicle.

4. The method of claim 1 further including suspending a pouch from the suspension line such that the pouch hangs from the suspension line in the vicinity of the rear seat and enables objects to be stored and held within the pouch.

5. The method of claim 4 further including extending one or more tether lines from the pouch such that a toy or other object can be secured to the end of the one or more tether lines.

6. The method of claim 4 wherein the pouch includes one or more lines secured to the pouch and extending therefrom and including terminal ends that have fasteners thereon for securing toys and other objects to the terminal ends such that the toys and objects can be actually suspended from the pouch itself.

7. A kit for holding and suspending objects above a rear seat of a vehicle in easy reach of a child stationed on the seat, comprising:
   a. a flexible suspension line having opposed end portions;
   b. means formed on the opposite end portions of the flexible suspension line for connecting the opposite end portions of the suspension line to opposed supports located on opposite sides of the vehicle above a rear seat;
   c. a series of hanger lines having opposed end portions and securable to the suspension line such that they depend downwardly therefrom for holding and suspending objects;
   d. means formed on one end portion of the hanger lines for securing the hanger lines to the suspension lines; and
   e. object securing means formed on the other end portion of the hanger lines for securing objects to the hanger lines such that the objects are suspended and held in easy reach of a child stationed on the adjacent rear seat; and
   f. a pouch for receiving and holding objects and wherein the pouch includes at least one extension line that leads therefrom for connection to the suspension line such that the pouch may be suspended from the suspension line in easy reach of the child while stationed on the rear seat of the vehicle.

8. The kit of claim 7 wherein the pouch is of an open top construction.

9. The kit of claim 7 wherein the means formed on one end portion of each of the hanger lines for securing the hanger lines to the suspension line includes a hook and loop fastener spaced such that the end portion of each hanger line can be formed into a loop that encircles the suspension line, and wherein when each hanger line is suspended from the suspension line, each hanger line can be moved laterally back and forth along the suspension line.

10. The kit of claim 7 wherein the pouch includes a series of tether lines secured to the pouch and extending therefrom, each tether line including a terminal end having securing means thereon for securing toys or objects to the terminal ends of the tether lines extending from the pouch.

11. The kit of claim 7 wherein there is provided opposed rings secured to opposite ends of the suspension line and wherein the opposed rings function to attach to hanger hooks that are anchored on opposite sides of the rear seat area of the vehicle.

12. A kit for holding and suspending objects above a rear seat of a vehicle in easy reach of a child seated on the rear seat, comprising: a flexible suspension line having opposed end portions, the flexible suspension line designed td extend across the rear seat of a vehicle between two opposed supports formed on opposite sides of the vehicle; fasteners associated with each end portion of the suspension line for connecting the suspension line to the opposed supports disposed in the vehicle; a series of flexible hanger lines securable to the suspension line and when secured to the suspension line depending downwardly therefrom, each hanger line including first and second end portions; a fastener associated with the first end portion of each hanger line for securing the hanger line to the suspension line; a second fastener secured to the second end portion of the hanger line for securing objects to the hanger lines such that the objects may be suspended and held in easy reach of a child stationed on the rear seat of the vehicle; and a pouch for holding objects, the pouch including a securing line extending therefrom for securing the pouch to the suspension line.

13. The kit of claim 12 wherein the pouch includes a series of toy tether lines that are secured to the pouch and which extend therefrom, each toy tether line including a terminal end portion having a fastener formed thereon for securing a toy or other object thereto.

14. The kit of claim 12 wherein the suspension line includes a pair of rings secured to opposite ends thereof, each ring functioning to be secured to a hanger hook secured to one side of the vehicle.

15. The kit of claim 7 wherein the at least one extension line extending from the pouch includes a terminal end portion provided with means for connecting the at least one extension line and the pouch to the suspension line.

* * * * *